United States Patent
Park et al.

(10) Patent No.: US 7,885,165 B2
(45) Date of Patent: Feb. 8, 2011

(54) OPTICAL PICK-UP DEVICE

(75) Inventors: Soo-han Park, Yongin-si (KR); Jang-hoon Yoo, Seoul (KR); Hag-hyeon Jang, Seongnam-si (KR); Yong-han Yoon, Suwon-si (KR); Soo-jin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 11/332,243

(22) Filed: Jan. 17, 2006

(65) Prior Publication Data

US 2006/0164708 A1    Jul. 27, 2006

(30) Foreign Application Priority Data

Jan. 24, 2005   (KR) ..................... 10-2005-0006420

(51) Int. Cl.
G11B 7/12   (2006.01)

(52) U.S. Cl. ............................... 369/112.03; 369/44.32

(58) Field of Classification Search ............. 369/44.32, 369/112.01, 112.02, 112.03, 115, 44.23
See application file for complete search history.

(56) References Cited

U.S. PATENT DOCUMENTS

| | | | |
|---|---|---|---|
| 5,734,637 A | 3/1998 | Ootaki et al. | |
| 2002/0003755 A1* | 1/2002 | Fujita et al. | 369/44.23 |
| 2002/0012313 A1* | 1/2002 | Kimura et al. | 369/112.08 |
| 2003/0185134 A1* | 10/2003 | Kimura et al. | 369/112.08 |
| 2004/0022164 A1* | 2/2004 | Nishioka et al. | 369/112.05 |
| 2004/0061951 A1 | 4/2004 | Nakano et al. | |
| 2004/0213131 A1* | 10/2004 | Kimura et al. | 369/112.03 |
| 2004/0257958 A1* | 12/2004 | Kimura et al. | 369/112.03 |
| 2005/0063282 A1* | 3/2005 | Takada et al. | 369/112.04 |
| 2005/0157623 A1* | 7/2005 | Itonaga | 369/112.05 |
| 2005/0270925 A1 | 12/2005 | Yamamoto et al. | |

FOREIGN PATENT DOCUMENTS

| | | |
|---|---|---|
| CN | 1501113 A | 6/2004 |
| CN | 1540646 A | 10/2004 |
| JP | 07-014205 | 1/1995 |
| JP | 10-275359 | 10/1998 |

(Continued)

Primary Examiner—Wayne R Young
Assistant Examiner—Thomas D Alunkal
(74) Attorney, Agent, or Firm—Roylance, Abrams, Berdo & Goodman, L.L.P.

(57) ABSTRACT

An optical pickup device according to an embodiment of the present invention comprises a light source for projecting a beam of light to record and reproduce information with respect to an optical recording medium. A collimating lens is disposed on a path of the light to converge and convert the light into a parallel beam. An object lens condenses the parallel beam from the collimating lens and projects the parallel beam onto the optical recording medium. An optical element is disposed between the collimating lens and the object lens. A first actuator moves the collimating lens along the optical axis to thereby control a distance between the collimating lens and the optical element. A first controller drives the first actuator to find a position for the collimating lens, for reducing aberration generated in the light being projected to the optical recording medium. Accordingly, the aberration can be effectively prevented, thereby improving recording and reproducing performance of the optical pickup device.

15 Claims, 3 Drawing Sheets

FOREIGN PATENT DOCUMENTS

| | | |
|---|---|---|
| JP | 2000-260056 | 9/2000 |
| JP | 2003-141766 | 5/2003 |
| JP | 2003-167190 | 6/2003 |
| JP | 2003-303436 | 10/2003 |
| JP | 2004-103087 | 4/2004 |
| KR | 2004-030949 | 4/2004 |

\* cited by examiner

OPTICAL PICK-UP DEVICE

CROSS-REFERENCE TO RELATED APPLICATIONS

This application claims benefit under 35 U.S.C. §119(a) of Korean Patent Application No. 2005-6420, filed on Jan. 24, 2005, the entire contents of which are hereby incorporated by reference.

BACKGROUND OF THE INVENTION

1. Field of the Invention

The present invention relates to an optical pickup device. More particularly, the present invention relates to an optical pickup device being provided with a position-controllable collimating lens and a dedicated optical element for compensation of aberration.

2. Description of the Related Art

Optical recording media currently used include a compact disc (CD) and digital a versatile disc (DVD). Recently, blueray discs (BD) using a blue ray have been marketed. The emergence of new optical recording media is intended for high-density recordation which can be implemented by shortening a wavelength of a light source or increasing the numerical aperture (NA) of an object lens. Although a wavelength of 650 nm, and a NA of 0.6 are used for DVD, use of a blue light source having a wavelength of 400~408 nm and increased NA of an object lens up to 0.65~0.85 may be considered for a higher-density optical disk.

However, some problems arise when using a short wavelength of a laser light source or higher NA of an object lens. Such problems which were almost ignorable in an optical pick-up device comprising a combination of a low NA object lens and a comparatively long wavelength of a laser light source for implementing recordation and reproduction of information relative to the conventional optical disc such as CD or DVD must be addressed in a successful implementation of a BD device.

One of the problems is an axial chromatic aberration occurring in an object lens due to minor oscillating wavelength changes in the laser light source. Change of refractive index due to the minor wavelength changes in general optical lens component increases as the wavelength is shorter. Accordingly, the amount of defocusing of a focus generated due to the fine wavelength change is increased.

However, the shorter the wavelength being used in the object lens, the lower a depth of the focus is. As a result, even a small amount of defocusing is not allowed. Therefore, in an optical system utilizing a short-wavelength light source such as a celadon semiconductor laser and a high-NA object lens, correction of chromatic aberration becomes a critical matter in order to prevent mode hopping of the semiconductor laser, change in wavelength resulted from change of output power, or deterioration of wave front aberration due to overlapping at high frequency.

Another problem caused by a high NA object lens and a short wavelength of the laser light source occurs when using a dual-layer optical disc comprising two data layers. In general dual-layer optical discs, more specifically in the BD, an interval between first and second layers is approximately 25±7 μm, whereas the interval between first and second layers in-the high definition (HD)-DVD is approximately 20~40 μm. In order to record and reproduce data with respect to each layer, the laser light needs to be focused on the layer in recording or reproducing.

In the dual-layer optical disc, however, lengths of optical paths for the laser light being incident to the optical disc to advance to the respective layers are different. Accordingly, a range of spherical aberration increases in the dual-layer optical disc, compared to in the conventional single-layer DVD or dual-layer DVD in which the spherical aberration is within a predetermined error range.

The optical system under such an environment may have a collimating lens configured by a diffractive optical element (DOE) pattern so as to correct the chromatic aberration.

On the other hand, the chromatic aberration may be corrected by constructing an afocal optical system by a concave lens and a convex lens and adjusting an interval between the lenses.

Although the former optical system utilizing the DOE is widely used, it has a problem in that a coma aberration is abruptly generated as an incident angle of the light increases since the aberration changes according to a variation of the incident angle of the light. The coma aberration refers to a state that an image is not properly formed because of the light being obliquely incident.

The latter optical system using two lenses for correction of chromatic aberration also has a problem of its increased volume. Also, since the two lenses move together, a margin of tolerance decreases in producing the optical system, thereby degrading productivity and increasing the manufacturing cost of the optical pickup device.

Furthermore, recently, an improved lens capable of being compatibly used in both the HD-DVD and the BD has been in need. In this case, however, since thickness of the discs used in the HD-DVD and the BD are respectively 0.6 mm and 0.1 mm, spherical aberration becomes considerable.

SUMMARY OF THE INVENTION

An aspect of the present invention is to solve at least the above problems and/or disadvantages and to provide at least the advantages described below. Accordingly, an aspect of the present invention is to provide an optical pickup device capable of improving productivity by providing a collimating lens that is movable on an optical axis and a diffractive optical element (DOE) or a liquid-crystal lens as a dedicated optical element, in order to correct aberrations, and improving performance of recording and reproducing with respect to an optical recording medium.

In order to achieve the above-described aspects of the present invention, there is provided an optical pickup device comprising a light source for projecting light to record and reproduce information with respect to an optical recording medium. A collimating lens is disposed on a path of the light to converge and convert the light into a parallel light. An object lens condenses the parallel light from the collimating lens and projects the parallel light onto the optical recording medium. An optical element is disposed between the collimating lens and the object lens. A first actuator moves the collimating lens along the optical axis to thereby control a distance between the collimating lens and the optical element. A first controller drives the first actuator to find a position for the collimating lens, for reducing aberration generated in the light being projected to the optical recording medium.

The light projected from the light source preferably has a wavelength band capable of recording and reproducing information with respect to one of a compact disc (CD), a digital versatile disc (DVD), a high definition (HD)-DVD and a blue-ray disc (BD).

The first controller preferably drives the first actuator to move the collimating lens on the optical axis, in order to reduce the aberration.

The collimating lens is preferably moved along the optical axis toward the optical element by at least 1.0 mm.

The optical element may comprise a lens for reducing chromatic aberration.

The optical element may comprise a diffractive optical element (DOE) lens having a DOE thereon.

The optical element may be implemented by a lens comprising liquid or liquid-crystal.

The optical element preferably made of any one of glass, plastic or polymer.

The optical element is preferably disposed at a position where view angle characteristic of the light being projected from the light source can be reduced.

The optical axis of the light deviated due to the view angle characteristic preferably passes through the center of the optical element.

The optical axis of the light deviated due to the view angle characteristic passes within a predetermined range from the center of the optical element.

According to another embodiment of the present invention, the optical pickup device further comprises a second actuator for driving the optical element. A second controller finds a condition of the optical element, for reducing the aberration generated in the light being projected onto the optical recording medium.

The second controller preferably moves the optical element by driving the second actuator so as to reduce the view angle characteristic of the light being projected from the light source.

The second controller preferably finds a condition of the optical element, for reducing the aberration generated in the light being projected onto the optical recording medium.

The second controller preferably moves the optical element by driving the second actuator so that the optical axis of the light projected from the light source, which is deviated due to the view angle characteristic passes through the center of the optical element.

The second controller preferably moves the optical element by driving the second actuator so that the optical axis of the light projected from the light source, which is deviated due to the view angle characteristic passes within a predetermined range from the center of the optical element.

BRIEF DESCRIPTION OF THE DRAWING FIGURES

The above aspects and other features of the present invention will become more apparent by describing in detail exemplary embodiments thereof with reference to the attached drawing figures, in which.

Figure 1:
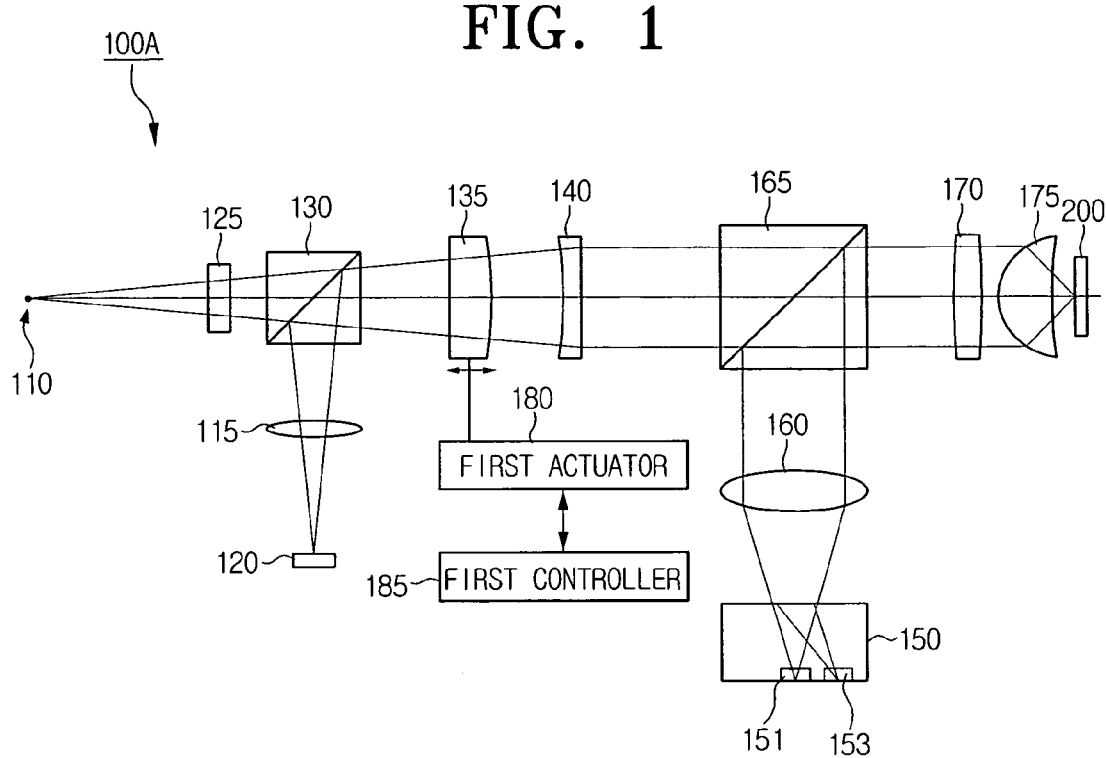
FIG. 1 is a view showing the structure of a first optical pickup device according to an embodiment of the present invention.
Figure 3:
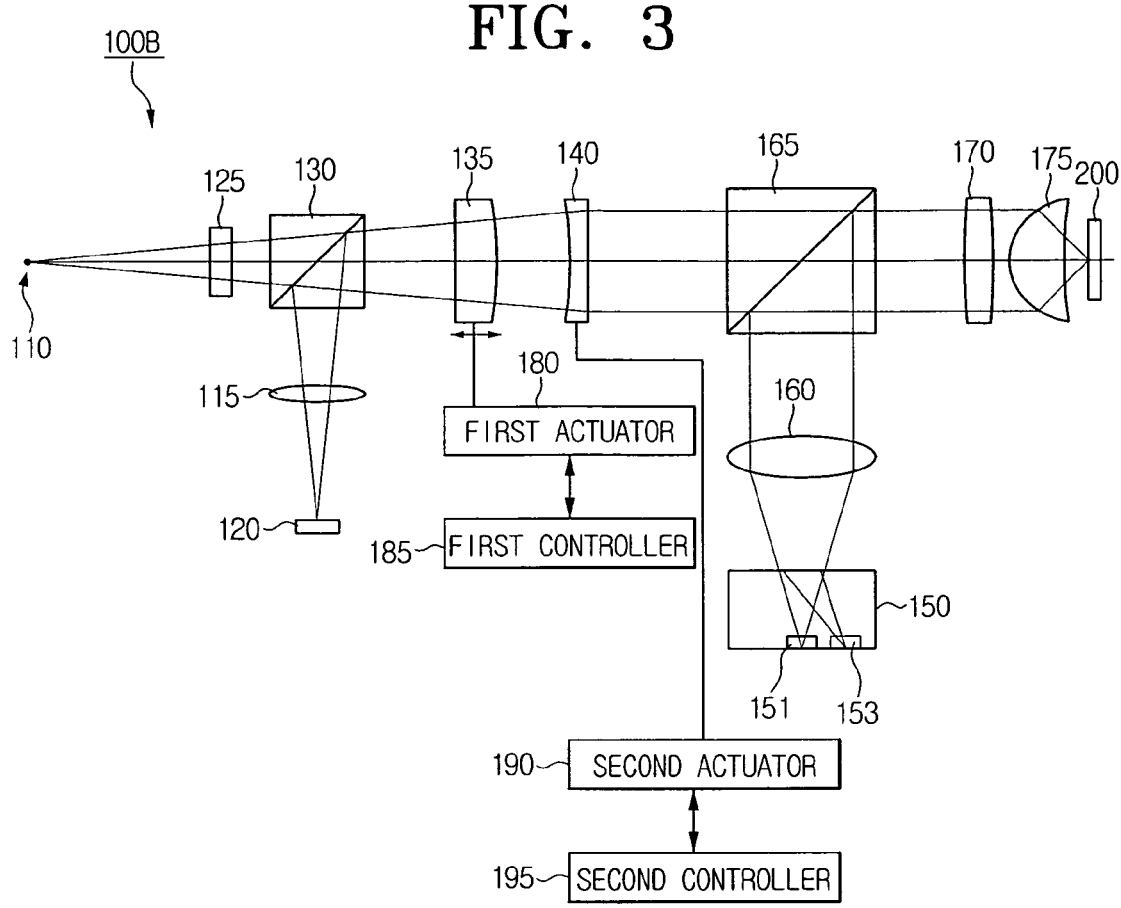
FIG. 3 is a view showing the structure of a second optical pickup device according to an embodiment of the present invention.
Figure 4:
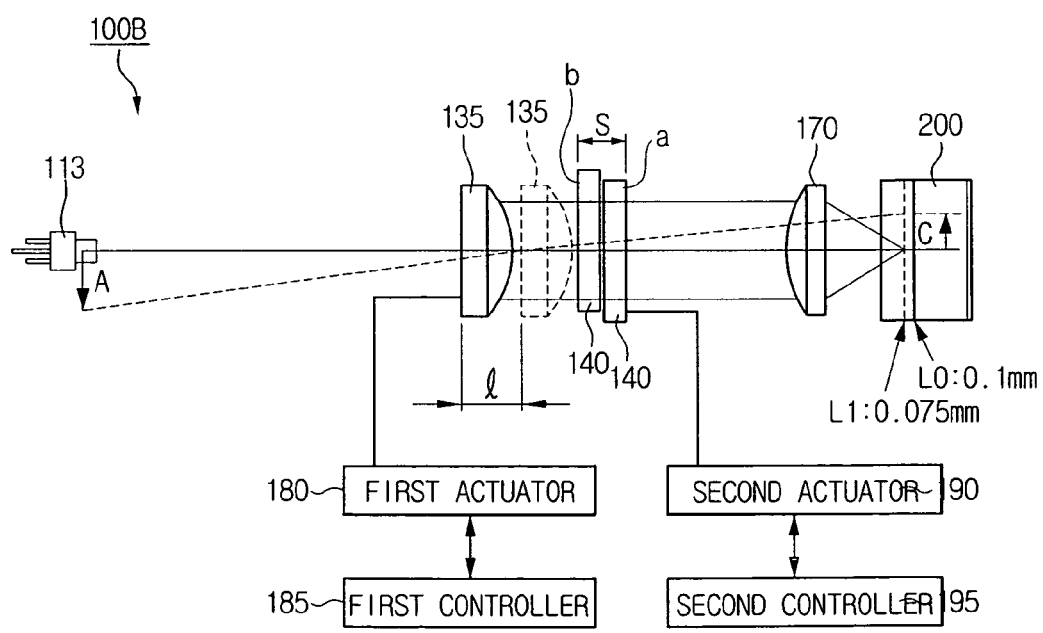
Figure 5:
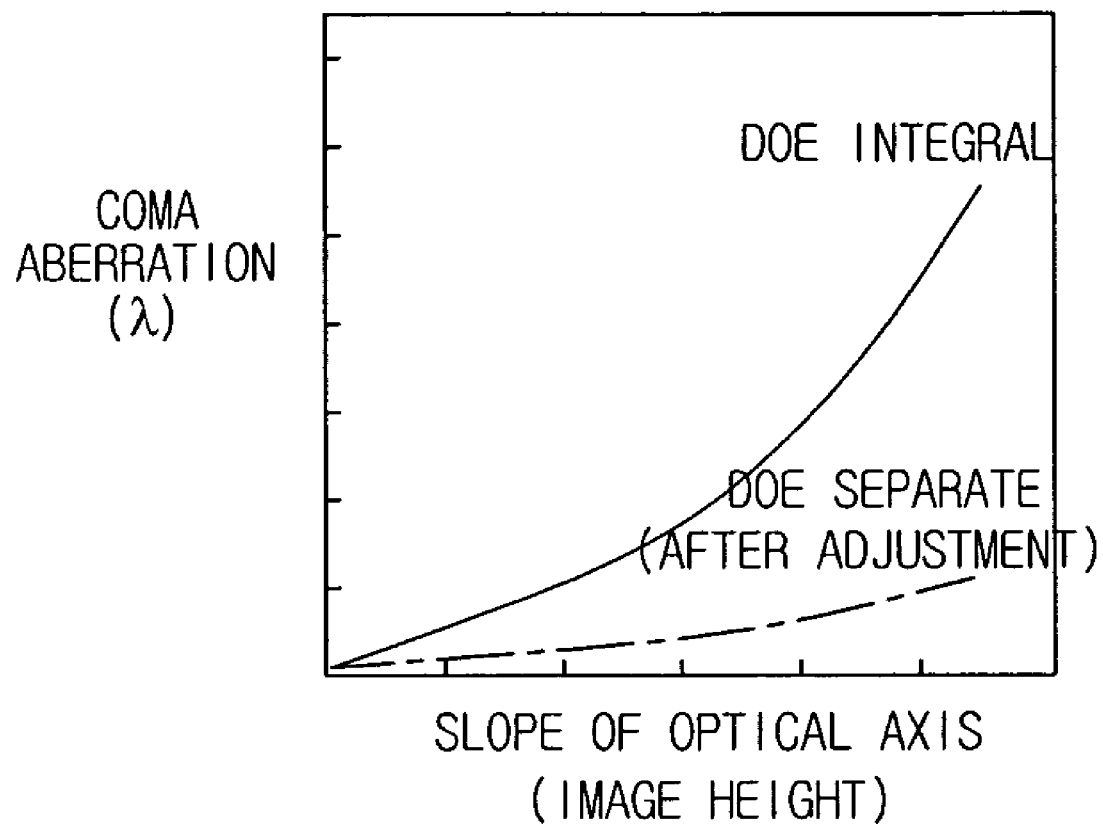

FIG. 4 is a view showing the structure of a collimating lens and an optical element in the second optical pickup device of FIG. 3; and FIG. 5 is a graph comparatively showing coma aberrations generated in the structure integrally comprising the collimating lens and the optical element shown in FIG. 1 and the structure according to the present invention Throughout the drawings, like reference numbers will be understood to refer to like elements, features and structures.

DETAILED DESCRIPTION OF THE EXEMPLARY EMBODIMENTS

Hereinafter, exemplary embodiments of the present invention will be described in detail with reference to the accompanying drawing figures.

The matters defined in the description such as a detailed construction and elements are provided to assist in a comprehensive understanding of the invention. Thus, it is apparent that various changes and modifications to the embodiments described herein can be made without departing from the scope and spirit of the invention. Also, descriptions of well-known functions or constructions are omitted for clarity and conciseness.

For convenience, an optical pickup device for recording and reproducing data with respect to a blue-ray optical disc will be described by way of an example. The optical pickup device is preferably compatible with compact discs (CDs), digital versatile discs (DVDs) and high definition (HD)-DVDs. However, applications of the present invention are not limited to such an optical pickup device for BD.

FIG. 1 shows the structure of an optical pickup device according to an embodiment of the present invention.

Referring to FIG. 1, a first optical pickup device 100A comprises a first light source 110, a first sensor lens 115, an optical detector 120, a diffraction grating 125, a first beam splitter 130, a collimating lens 135, an optical element 140, an optical module 150, a second sensor lens 160, a second beam splitter 165, a holographic optical element (HOE) 170, an object lens (OL) 175, a first actuator 180, and a first controller 185.

The first light source 110 is implemented by a BD laser diode which projects a laser beam of approximately 405 nm wavelength.

The first sensor lens 115 comprises a concave lens for focusing a laser beam being reflected from an optical disc 200 and incident again toward the optical detector 120.

The optical detector 120 receives the laser beam diverged into a plurality of spots, converts optical signals into electric signals and reads information from the optical disc 200.

The first beam splitter 130 changes an optical path of the laser beam by reflecting the laser beam in a polarizing direction using a polarization element or transmits the laser beam.

The collimating lens 135 converges the split laser beam so that the laser beam advances in a parallel manner toward the HOE 170. Being moved by the first actuator 180 in a direction of an optical axis, the collimating lens 135 controls a distance to the optical element 140 as well as a distance to the OL 175 therefrom.

As the distances between the collimating lens 135 and the OL 175 and between the collimating lens 135 and the optical element 140 are controlled, the focal distance of the laser beam is changed and accordingly, a focus may be formed on first and second layers of a dual-layer optical disc, respectively. In this case, aberration characteristics such as spherical aberration and coma aberration remarkably decrease.

The optical element 140 comprises a diffractive optical element (DOE) formed thereon to correct chromatic aberration using a diffraction characteristic of light.

Furthermore, the optical element 140 may be an active element operated by electrical voltage, such as a lens comprising liquid or liquid-crystal. The optical element 140 may be made of glass, plastic or polymer.

Especially, by providing the optical element 140 separately from the collimating lens 135 and moving only the collimating lens 135, the margin of tolerance in manufacturing processes for the first optical pickup device 100A can be increased compared to in the structure where the optical element 140 and the collimating lens 135 move together as one unit.

Moreover, margin of tolerance may be considered in constructing the optical element 140 in preparation for a case that the laser beams projected from first and second light sources 110 and 151 are deviated due to a view angle characteristic.

Here, the view angle characteristic refers to a characteristic of light generating an error in height of an image spot by an off-axis light when only the light source is deviated from its correct position with the optical system light not moved. Such a view angle characteristic of light causes the aberration.

The first optical pickup device 100A is designed in consideration of the margin of tolerance of the optical element 140 so that the optical element 140 is disposed on a position capable of reducing the view angle characteristic, that is, the position where the view angle is widened.

In other words, the margin of tolerance may be designed in a manner that the optical axes of the lights projected from the first and the second light sources 110 and 151 and deviated by the view angle characteristic pass through a center of the optical element 140. Therefore, the position where the outermost optical axis among the deviated optical axes passes through the center of the optical element 140 is the maximum margin of tolerance.

Alternatively, the margin of tolerance may be designed so that the off-axis light passes through within a predetermined range from the center of the optical element 140.

Hereinbelow, the collimating lens 135 movable along the direction of the optical axis and the optical element 140 (FIG. 2) provided separately from the collimating lens 135 will be described with reference to FIGS. 2 and 3.

The optical module 150 comprises the second light source 151 and a monitor optical detector 153.

The second light source 151 is implemented by a laser diode for DVD, having a wavelength of approximately 660 nm.

The monitor optical detector 153 detects a laser beam projected from the second beam splitter 165 and controls luminosity of the laser beam projected from the second light source 151. The laser beam incident to the monitor optical detector 153 is converted into the electrical signals and used for auto power control.

The sensor lens 160 condenses the laser beam being reflected from the optical disc 200 and the beam is re-incident toward the monitor optical detector 153.

The second beam splitter 165 reflects and transmits the laser beam projected from the second light source 165 by a predetermined ratio.

The HOE 170 comprises a hologram element and is used for a compatible OL. The HOE 170 may be formed integrally with the OL 175 on a surface of the OL 175.

The OL 175 condenses the laser beam passed through the HOE 170 to thereby form a focus on one of the layers of the optical disc 200. The laser beam is reflected from the optical disc 200.

The laser beam reflected from the optical disc 200 advances along an optical path opposite to the optical path when incident, sequentially passing through the OL 175, the HOE 170, the optical element 140, and the collimating lens 135.

The first actuator 180 moves the collimating lens 135 using an electromagnetic force so as to control the distance from the collimating lens 135 to the optical element 140. Also, under the control of the first controller 185, the first actuator 180 moves the collimating lens 135 to a position capable of reducing the aberration.

The first controller 185 controls the overall operation of the first optical pickup device 100A and drives the first actuator 180 to find a position of the collimating lens 135 for reducing the aberration occurring to the laser beam being projected to the optical disc 200.

Figure 2:
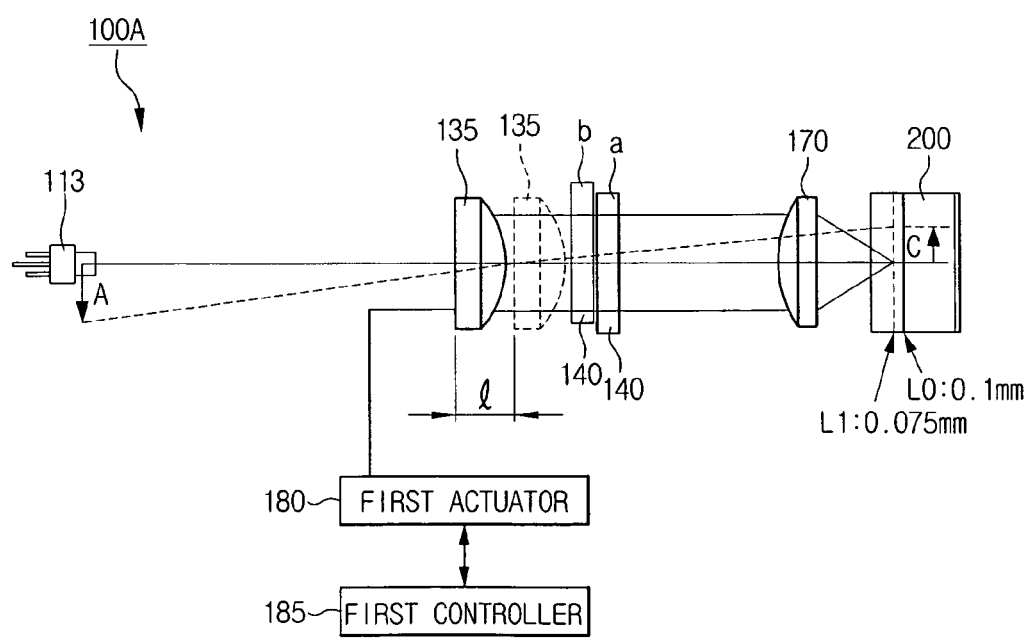
FIG. 2 is a view showing in detail the structure of a collimating lens and an optical element in the first optical pickup device of FIG. 1.

FIG. 2 shows the collimating lens 135 and the optical element 140 mounted in the first optical pickup device 100A shown in FIG. 1 in greater detail.

Referring to FIGS. 1 and 2, only the collimating lens 135 moves with the first optical pickup device 100A constructing the optical system fixed. This is to focus on both layers of the dual-layer optical disc 200, that is, the first layer L0 distanced by 0.1 mm and the second layer L1 distanced by 0.075 mm.

However, the movement of only the collimating lens 135 draws the same result of moving a third light source 113 by an arrowed degree A (FIG. 2). Therefore, in the optical system, the image of an object becomes off-axis through the collimating lens 135, thereby inducing the aberration by the view angle characteristic of light, the aberration which is an error in a position of the formed image by a predetermined height C (FIG. 2) due to the off-axis light.

The first optical pickup device 100A is therefore designed so that the optical element 140 is disposed on the position capable of reducing the view angle characteristic, that is, capable of widening the view angle. In other words, the margin of tolerance with respect to the position of the optical element 140 should be designed in a manner that the off-axis light passes through a predetermined range from the center of the optical element 140.

The optical element 140 can be disposed at a position 'a' without the view angle characteristic of light, and at a position 'b' when there occurs the error in the image position by the predetermined height C. Considering this, the margin of tolerance of the optical element 140 can be determined.

The collimating lens 135 can be moved by a distance '1' from a distal position to a proximal position with respect to the optical element 140, so as to focus on the first and the second layers L0 and L1 of the optical disc 200, respectively.

The collimating lens 135 as moved by the distance '1' from the distal position to the proximal position from the optical element 140 is illustrated by a dotted line in FIG. 2.

The collimating lens 135 can preferably be moved by at least 1.0 mm. In other words, the interval between the collimating lens 135 and the optical element 140 can be changed by at least 1.0 mm.

When the position of the collimating lens 135 which reduces the aberration occurring to the laser beam projected to the optical disc 200 is found by the first controller 185, the first actuator 180 moves the collimating lens 135 under the control of the first controller 185.

Thus, the aberration such as the spherical aberration and the coma aberration can be corrected by adopting the optical element 140 comprising the collimating lens 135 movable on the optical axis and the DOE separately provided from the collimating lens 135.

It is apparent that the lens comprising liquid or liquid-crystal may be used for the optical element 140 and also, the optical element 140 may be made of glass, plastic or polymer.

FIG. 3 shows the structure of a second optical pickup device according to another embodiment of the present invention.

Description of the structure and property of the elements of FIG. 3 that are substantially the same as in FIG. 1 will be omitted for clarity and conciseness.

Referring to FIG. 3, a second optical pickup device 100B comprises the first light source 110, the first sensor lens 115, the optical detector 120, the diffraction grating 125, the first beam splitter 130, the collimating lens 135, the optical element 140, the optical module 150, the second sensor lens 160, the second beam splitter 165, the holographic optical element (HOE) 170, the object lens (OL) 175, the first actuator 180, the first controller 185, a second actuator 190 and a second controller 195.

The optical element 140 is moved by the second actuator 190 under the control of the second controller 195 so as to be disposed on a position capable of reducing the view angle characteristic of the light being projected from the first and the second light sources 110 and 151.

In other words, the optical element 140 is moved in a manner that the optical axes of the light projected from the first and the second light sources 110 and 151 and deviated by the view angle characteristic pass through a center of the optical element 140. Therefore, the position where the outermost optical axis among the deviated optical axes passes through the center of the optical element 140 is the maximum range for moving the optical element 140.

Alternatively, the margin of tolerance may be designed so that the off-axis light passes through within a predetermined range from the center of the optical element 140.

The second actuator 190 moves the optical element 140 using an electromagnetic force to the position that reduces the aberration characteristic, under the control of the second controller 195.

In cooperation with the first controller 185, the second controller 195 controls the overall operation of the second optical pickup device 100B. More specifically, the second controller 195 drives the second actuator 190 to find a position of the optical element 140 that reduces the aberration occurring to the laser beam being projected to the optical disc 200.

Especially, in order to reduce the aberration, the second controller 195 drives the second actuator 190 to move the optical element 140 to the position where the aberration generated by the view angle characteristic of light is reduced.

When the lens comprising liquid or liquid-crystal is used for the optical element 140, the second controller 195 may find a condition of reducing the aberration and electrically drive the optical element 140.

FIG. 4 shows the structure of the collimating lens 135 and the optical element 140 provided in the second optical pickup device 100B of FIG. 3 in greater detail.

The elements cited by the same reference numerals as in FIG. 2 have substantially the same structure and property as the corresponding elements of FIG. 2. In addition, since the principle of the optical system of FIG. 4 is essentially the same as the principle of the optical system described with respect to FIG. 2, it will not be described in detail.

While the margin of tolerance is designed in consideration of the view angle characteristic in constructing the optical element 140 with reference to FIG. 2, the optical element 140 is moved by driving the second actuator 195 under the control of the second controller 195 according to FIG. 4.

The optical axis of the light projected from the first light source 110 is deviated due to the view angle characteristic. Therefore, the second actuator 190 is driven to move the optical element 140 so that the off-axis light can pass through the center of the optical element 140.

For example, when the first light source 110 is moved by the arrowed degree A due to the view angle characteristic, the image formed through the collimating lens 135 is off-axis by a predetermined height C. In this case, the second controller 195 drives the second actuator 190 to move the optical element 140 by a distance S, that is, from the position 'a' to the position 'b'.

Also, the first controller 185 drives the first actuator 180 to relocate the collimating lens 135 so that the aberration is reduced.

FIG. 5 is a graph for comparing the coma aberrations generated in an optical system comprising an integral collimating lens 135 and optical element 140, with an optical system according to an embodiment of the present invention.

Referring to FIGS. 1 to 5, the slope of a solid-line graph showing the view angle aberration of the optical system having the integral collimating lens 135 and optical element 140 shows that the coma aberration abruptly increases as tilt of the optical axis increases.

On the other hand, as shown by a dotted-line graph, when the collimating lens 135 is movable and the optical element 140 is separately provided from the collimating lens 135, the coma aberration considerably decreases.

As can be appreciated from the above description, by separately providing the collimating lens 135 and the optical element 140, the margin of tolerance of the optical pickup device can be increased, thereby improving productivity and saving manufacturing costs.

Furthermore, recording performance of the optical pickup device can be much enhanced by precisely correcting the aberration generated at the lens, such as spherical aberration and coma aberration.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical pickup device, comprising:
    a light source projecting a light to record and reproduce information with respect to an optical recording medium;
    a collimating lens disposed on a path of the light to converge and convert the light into a parallel light;
    an object lens condensing the parallel light from the collimating lens and project the parallel light onto the optical recording medium;
    an optical element disposed between the collimating lens and the object lens;
    a first actuator moving the collimating lens along the optical axis to thereby control a distance between the collimating lens and the optical element;
    a first controller for driving the first actuator to find a position for the collimating lens that reduces aberration generated in the light being projected to the optical recording medium;
    a second actuator driving the optical element and moving the optical element with respect to the object lens; and
    a second controller for driving the second actuator to find a condition of the optical element, for reducing the aberration generated in the light being projected onto the optical recording medium.

2. The optical pickup device of claim 1, wherein the light projected from the light source has a wavelength capable of recording and reproducing information with respect to one of a compact disc (CD), a digital versatile disc (DVD), a high definition (HD)-DVD and a blue-ray disc (BD).

3. The optical pickup device of claim 1, wherein the first controller drives the first actuator to move the collimating lens on the optical axis, in order to reduce the aberration.

4. The optical pickup device of claim 1, wherein the collimating lens is moved along the optical axis toward the optical element within a range of at least 1.0 mm.

5. The optical pickup device of claim 1, wherein the optical element comprises a lens for reducing chromatic aberration.

6. The optical pickup device of claim 1, wherein the optical element comprises a diffractive optical element (DOE) lens comprising a DOE.

7. The optical pickup device of claim 1, wherein the optical element comprises a liquid or liquid-crystal lens.

8. The optical pickup device of claim 1, wherein the optical element comprises at least one of glass, plastic or polymer.

9. The optical pickup device of claim 1, wherein the optical element is disposed at a position where a view angle characteristic of the light being projected from the light source is reduced.

10. The optical pickup device of claim 1, wherein the optical axis of the light deviated due to the view angle characteristic passes through the center of the optical element.

11. The optical pickup device of claim 1, wherein the optical axis of the light deviated due to the view angle characteristic passes within a predetermined range from the center of the optical element.

12. The optical pickup device of claim 1, wherein the second controller moves the optical element by driving the second actuator so as to reduce the view angle characteristic of the light being projected from the light source.

13. The optical pickup device of claim 1, wherein the second controller finds a condition of the optical element for reducing the aberration generated in the light being projected onto the optical recording medium.

14. The optical pickup device of claim 1, wherein the second controller moves the optical element by driving the second actuator so that the optical axis of the light projected from the light source, which is deviated due to the view angle characteristic, passes through the center of the optical element.

15. The optical pickup device of claim 1, wherein the second controller moves the optical element by driving the second actuator so that the optical axis of the light projected from the light source, which is deviated due to the view angle characteristic, passes within a predetermined range from the center of the optical element.

* * * * *